(12) United States Patent
Ollila

(10) Patent No.: US 11,698,523 B2
(45) Date of Patent: *Jul. 11, 2023

(54) COMBINED BIOMETRICS CAPTURE SYSTEM WITH AMBIENT FREE INFRARED

(71) Applicant: Intel Corporation, Santa Clara, CA (US)

(72) Inventor: Mikko Ollila, Tampere (FI)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/748,643

(22) Filed: May 19, 2022

(65) Prior Publication Data

US 2022/0276482 A1 Sep. 1, 2022

Related U.S. Application Data

(63) Continuation of application No. 17/014,360, filed on Sep. 8, 2020, now Pat. No. 11,353,692, which is a
(Continued)

(51) Int. Cl.
*G02B 26/00* (2006.01)
*H04N 5/33* (2023.01)
(Continued)

(52) U.S. Cl.
CPC ......... *G02B 26/001* (2013.01); *G06V 10/143* (2022.01); *G06V 10/147* (2022.01);
(Continued)

(58) Field of Classification Search
CPC .. G06V 10/143; G06V 10/147; G02B 26/001; H04N 25/531; H04N 23/55;
(Continued)

(56) References Cited

U.S. PATENT DOCUMENTS 6,024,449 A 2/2000 Smith
7,280,678 B2 10/2007 Haven et al.
(Continued)

OTHER PUBLICATIONS

United States Patent and Trademark Office, "Non-Final Office action," issued in connection with U.S. Appl. No. 15/183,917, dated Aug. 7, 2019, 12 pages.
(Continued)

*Primary Examiner* — Gregory M Desire
(74) *Attorney, Agent, or Firm* — Hanley, Flight & Zimmerman, LLC

(57) ABSTRACT

An electronic device is disclosed herein that includes an infrared light source to emit infrared light, a rolling shutter sensor, and at least one processor. The at least one processor is to: cause the rolling shutter sensor to output a first signal corresponding to a first frame of image data during exposure to the infrared light, reset the rows of the rolling shutter sensor at a same time, cause the rolling shutter sensor to output a second signal corresponding to a second frame of image data without exposure to the infrared light from the infrared light source, determine a difference between the first signal and the second signal to generate an ambient infrared free frame, and recognize a face based on the ambient infrared free frame.

25 Claims, 15 Drawing Sheets

Related U.S. Application Data continuation of application No. 15/183,917, filed on Jun. 16, 2016, now Pat. No. 10,775,605.

(51) Int. Cl.

| | |
|---|---|
| *G06V 10/143* | (2022.01) |
| *G06V 10/147* | (2022.01) |
| *H04N 23/55* | (2023.01) |
| *H04N 25/531* | (2023.01) |
| *G02F 1/1347* | (2006.01) |
| *G02F 1/153* | (2006.01) |

(52) U.S. Cl.
CPC .............. *H04N 5/33* (2013.01); *H04N 23/55* (2023.01); *H04N 25/531* (2023.01); *G02F 1/13473* (2013.01); *G02F 1/153* (2013.01); *G02F 2203/055* (2013.01); *G02F 2203/11* (2013.01)

(58) Field of Classification Search
CPC ....... H04N 5/33; G02F 1/13473; G02F 1/153; G02F 2203/055; G02F 2203/11
See application file for complete search history.

(56) References Cited

U.S. PATENT DOCUMENTS

| | | | |
|---|---|---|---|
| 7,405,867 B2* | 7/2008 | Park ..................... | G02F 1/0121 359/290 |
| 8,254,010 B2* | 8/2012 | Kimura ................. | H04N 5/332 349/96 |
| 8,289,300 B2 | 10/2012 | Keam | |
| 8,848,293 B2 | 9/2014 | Nishimura et al. | |
| 9,245,174 B2 | 1/2016 | Yuan | |
| 9,292,916 B2 | 3/2016 | Rowe | |
| 9,380,220 B2 | 6/2016 | Davis et al. | |
| 9,398,237 B2 | 7/2016 | Brady et al. | |
| 9,568,603 B2 | 2/2017 | Yahav et al. | |
| 9,816,803 B2 | 11/2017 | Kulkarni | |
| 9,838,622 B2 | 12/2017 | Tao et al. | |
| 9,971,937 B1 | 5/2018 | Ovsiannikov et al. | |
| 10,255,498 B2* | 4/2019 | Kim ...................... | G06V 40/19 |
| 10,466,359 B2 | 11/2019 | Meir et al. | |
| 10,775,605 B2 | 9/2020 | Ollila | |
| 2003/0219237 A1 | 11/2003 | Bastasz et al. | |
| 2015/0002734 A1 | 1/2015 | Lee | |
| 2015/0186722 A1* | 7/2015 | Cho ....................... | H04N 23/74 348/78 |
| 2017/0180614 A1 | 6/2017 | Ollila | |
| 2017/0364736 A1 | 12/2017 | Ollila | |
| 2018/0121724 A1* | 5/2018 | Ovsiannikov .......... | G06V 40/19 |
| 2019/0141264 A1* | 5/2019 | Kang ..................... | G06F 18/00 |
| 2020/0400939 A1 | 12/2020 | Ollila | |

OTHER PUBLICATIONS

United States Patent and Trademark Office, "Final Office action," issued in connection with U.S. Appl. No. 15/183,917, dated Feb. 7, 2020, 14 pages.

United States Patent and Trademark Office, "Notice of Allowance," issued in connection with U.S. Appl. No. 15/183,917, dated May 28, 2020, 14 pages.

United States Patent and Trademark Office, "Non-Final Office action," issued in connection with U.S. Appl. No. 17/014,360, dated Oct. 26, 2021, 15 pages.

United States Patent and Trademark Office, "Notice of Allowance," issued in connection with U.S. Appl. No. 17/014,360, dated Feb. 11, 2022, 8 pages.

\* cited by examiner

300A

400A

COMBINED BIOMETRICS CAPTURE SYSTEM WITH AMBIENT FREE INFRARED

RELATED APPLICATIONS

This patent arises from a continuation of U.S. patent application Ser. No. 17/014,360, which was filed on Sep. 8, 2020, which is a continuation of U.S. patent application Ser. No. 15/183,917, which was filed on Jun. 16, 2016. Priority is claimed to U.S. patent application Ser. No. 17/014,360 and U.S. patent application Ser. No. 15/183,917. U.S. patent application Ser. No. 17/014,360 and U.S. patent application Ser. No. 15/183,917 are hereby incorporation by reference in their entireties.

BACKGROUND

Electronic devices often include several cameras to collect infrared (IR) data according to various biometric systems. As used herein, biometric refers to metrics related to human characteristics. These metrics may include, but are not limited to, facial features, patterns of the human iris, and eye gaze tracking. An electronic device may include a facial recognition IR system, an iris recognition IR system, and an eye gaze tracking IR system. Each of these IR based systems may have separate and distinct hardware. Additionally, each IR system may be located on the top side of the electronic device, where numerous antennas, sensors, other cameras, and speakers are located. Physical space at the front of the electronic device may be valuable and limited.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION

Figure 1:
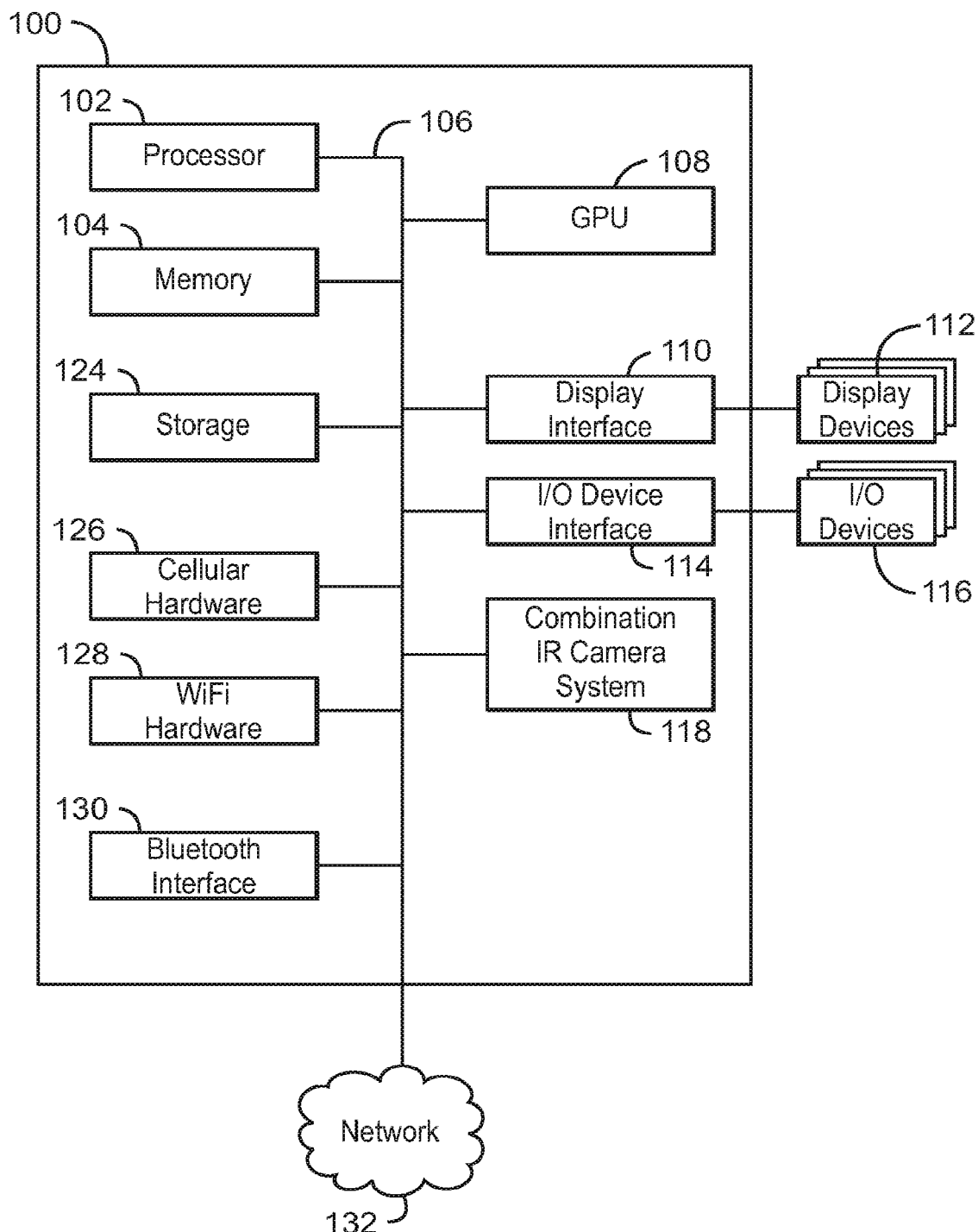
FIG. 1 is a block diagram of an electronic device that includes a combination camera system.

As discussed above, an electronic device may include several IR based systems with separate hardware. These systems are typically located on the front of the device, near or at the top of the device when in portrait mode. Space along the top of the device is also used for numerous antennas, indicators, cameras, speakers, and the like. Thus, the premium space at the front of the device may also be scarce.

Embodiments described herein relate generally to techniques for a combined biometrics capture system. A plurality of IR-based systems can be combined, regardless of the IR passband used for varying IR-based systems. In embodiments, ambient free IR is implemented. As used herein, ambient free IR refers to an IR illuminated frame where the ambient illuminated frame is subtracted.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an electronic device that includes a combination camera system. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads. For example, the GPU 108 may include an engine that processes infrared data.

The CPU 102 can be linked through the bus 106 to a display interface 110 configured to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The electronic device 100 also includes a combined IR camera system 118 for implementing several distinct recognition technologies. By implementing several different recognition technologies using a single hardware system, the cost of the electronic device 100 may be reduced since a single hardware system is used to replace three separate systems. Additionally, the physical space within the electronic device used to implement the separate hardware systems may be reduced. In embodiments, the combined IR camera system 118 captures various passbands of IR data, based on the particular biometric implementation. Moreover, the combined IR camera system 118 includes a rolling shutter system that can be used to implement a global shutter system. The elimination of a global shutter system may also reduce costs associated with the electronic device 100. The use of a rolling shutter system to implement a global shutter system also enables the use of a higher resolution sensor since global shutter sensors are typically only capable of capturing a minimum of 3 um pixels, whereas rolling shutter sensors pixels can typically capture a minimum of 0.9 um pixels. This different in shutters of the combined IR camera system 118 can reduce the height of the optics hardware within the combined IR camera system 118.

The electronic device may also include a storage device 124. The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 100 may access any network 132 without being tethered or paired to another device, where the network 132 is a cellular network.

The CPU 102 may also be linked through the bus 106 to WiFi hardware 128. The WiFi hardware is hardware according to WiFi standards (standards promulgated as Institute of Electrical and Electronics Engineers' (IEEE) 802.11 standards). The WiFi hardware 128 enables the electronic device 100 to connect to the Internet using the Transmission Control Protocol and the Internet Protocol (TCP/IP), where the network 132 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

The combined IR camera system 118 described in FIG. 1 may be used to implement a combined biometrics capture system. Biometric data is often captured via emitting is invisible radiant energy and capturing the resultant scene. The IR image is created using invisible radiant energy and includes electromagnetic radiation with wavelengths longer the wavelengths of visible light. In embodiments, and IR wavelength can range from the nominal red edge of the visible spectrum at 700 nanometers (frequency 430 THz) to 1 mm (300 GHz).

The IR passband of each biometric system may differ. For biometric data capture, the passband must be as narrow as possible for its intended use. If the passband is made too wide, ambient sun originated IR will affect the sensitivity of the IR capture, which can lead to spoofing. Spoofing occurs when a person or program successfully masquerades as another by falsifying data. Additionally, a passband that is too wide affects the ability to provide a consistent image via IR in diverse lightning or weather conditions, and allows for subtle changes in appearance including facial hair, cosmetic make up, eye wear, etc. An accurate passband also enables support of IR capture in darkness so that users are not frustrated and abandoning the system.

For example, a biometric system that track the eye gaze of a user typically uses a passband that is greater than 880 nanometers (nm), which is invisible for humans. An iris scanning system typically implements a passband that includes 800 nm, which may be visible to some humans. When these two systems are combined, any visible IR light band could be annoying to the user. In other words, during eye gaze tracking, a visible passband at 800 nm may be perceived by a user. In embodiments, eye gazing tracking is continuous and thus a passband of 880 nm or greater is better to use in an eye gaze tracking system because it is invisible to a user.

An iris scan system and an IR-based facial recognition system are both biometric logging systems that can exist in same system according to various operating system requirements. An iris scan system and an IR-based facial recognition system also both have different application areas. For example, an iris scanning system is much more secure and would be used with applications that require a high level of security, such as banking login applications. Facial recognition can be used for applications where a heightened level of security is not required. Moreover, eye gazing is a user interface input system that also is based on IR light and detection of retina and pupil movements. It would be advantageous if all of the cameras could be merged in to one.

Table 1 details the differences in several requirements for each of a face recognition, iris scan, and eye gaze IR-based system.

|  | Face Recognition | Iris Scan | Eye Gaze |
| --- | --- | --- | --- |
| Resolution | VGA | 2 megapixels | >4 megapixels |
| FOV | >60 HFOV | 30 DFOV | >60 HFOV |
| IR Passband | 840-870 nm | 800-850 nm | >880 nm |
| Sensor Type | Global Shutter | Rolling Shutter | Rolling Shutter |
| Focal Length | NA | 4 mm | NA |

The requirements described above are exemplary, and can vary across systems. Additionally, face recognition also requires ambient free IR. In ambient free IR, the ambient IR level is determined, and the ambient IR level is subtracted from the captured IR frames. The ambient IR level is used as a reference so that the resulting IR image capture does not change based on ambient lighting conditions. In embodiments, face recognition and the associated ambient IR requires a global shutter sensor. A global shutter sensor is implemented utilizing a rolling shutter according to the present techniques. Additionally, the techniques described herein enable a low cost CMOS sensor and much higher resolutions to be captured in a global shutter format.

Further, a camera hardware system is presented that covers all IR-based systems. For ease of description, the three IR-based systems described herein are face recognition, iris scan, and eye gaze. However, any IR-based biometric system may be combined into a single module according to the present techniques. In embodiments, a plurality of IR-based systems are combined via an adjustable IR pass filter, where the passband is adjusted by an electrical means to realize the desired passband of the system to be implemented. Moreover, the present techniques implement the ambient free IR using an adjustable filter and a rolling shutter sensor instead of global shutter sensor.

Figure 2A:
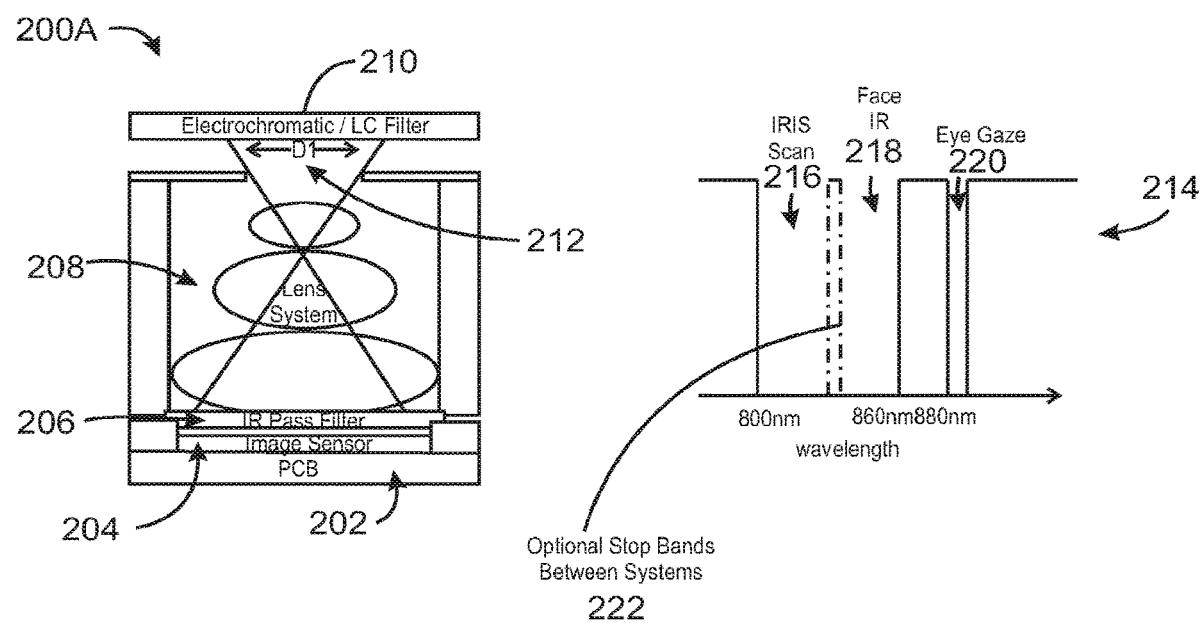
FIG. 2A is an illustration of a single camera system 200A that implements a plurality of technologies.

FIG. 2A is an illustration of a single camera system 200A that implements a plurality of IR-based systems. As discussed above, the combined capture system according to the present techniques can be used to implement each of a face recognition, iris scan, and eye gaze system. In this manner, the hardware used to realize each of the three systems is reduced.

The camera system 200A includes a printed circuit board (PCB) 202. The PCB 202 may be used to electrically connect the camera system 200 to other components that may be included in an electrical device. In some cases, the PCB 202 is a main circuit board or motherboard of the device 200. An image sensor 204 may be coupled with the PCB 200. The image sensor 204 may be any device that converts an optical image into an electrical signal. For example, the image sensor 204 may be a charge coupled device (CCD) sensor or a complementary metal-oxide-semiconductor (CMOS) sensor. A processor may be configured to read an electrical signal from the image sensor 204 and control an IR pass filter 206 to obtain the correct passband for the particular application or use of the camera system 200. The IR pass filter 206 is an optional component of a combined camera system according to the present techniques. The IR pass filter 206 may be used to reduce any out of spectrum signal that is passed to the IR pass filter 206. The IR pass filter 206 may also function as a dust shield and protect the underlying electrical components.

A lens system 208 may be any optical device that is to focus light onto the image sensor 204 through the IR pass filter 206. In embodiments, the lens system 208 may be a compound lens or an array of lenses. A processor may be configured to control the focal length of the lens system 208. A liquid crystal (LC) or electrochromatic filter 210 is placed on top of the camera system 200. A liquid crystal filter is described more fully with respect to FIG. 3A. An electrochromatic filter is described more fully with respect to FIG. 4C.

The filter 210 may be encompassed in glass that is used to cover a local opening 212 of the camera system 200. As illustrated, the camera system 200A has a local opening 212 of width D1. The glass may function as dust shield, and is preferably an IR pass instead of plain all pass glass. In embodiments, the glass may provide an additional IR pass filter. In embodiments, electrical control of the LC/electrochromatic filter 210 enables the system to vary to wavelengths that are allowed to pass.

In some cases, the stop band provided by the LC/electrochromatic filter 210 may be soft. Put another way, the LC/electrochromatic filter 210 may allow wavelengths outside of the desired wavelengths to pass. The IR filter 206, and any additional IR filter provides a sharp cutoff band that can be used to refine the stop bands. In embodiments, by using glass that includes an infrared cut off (IRCF), the camera system 200A is provided with provide sharp edges at least for the outer edges of combined IR passbands of a plurality of IR-based systems. If the tolerances of all components, including IR sources, are narrowed, additional stop bands can be built and active IR filter requirements for edge steepness is reduced.

For example, the LC/electrochromatic adjustable filter 210 may allow transmission of undesired wavelengths, and the optional IR pass filter 206 can be used to filter the undesirable signals and prevent them from passing as discussed above. The IR pass filter can also serve as a dust shield. Moreover, the desired wavelengths may be on the edge of the range of the adjustable range filter (such as the LC/electrochromatic filter) such that the transmitted wavelengths response becomes inaccurate. The IR pass filter can provide more a precise definition for system spectrum limits. In embodiments, the IR pass filter 206 can be replaced by glass that provides dust seal without a spectrum filter effect.

The passbands 214 illustrate the wavelengths allowed to pass via electrical control of the LC/electrochromatic filter 210 combined with an IR pass filter 206. As illustrated, the passband 216 of the iris recognition system may begin at 800 nm with an optional stop band 222 between the iris recognition system and the face recognition system passband 218. The eye gaze system passband 220 occurs at approximately 880 nm.

The stopband 222 between the iris recognition system passband 216 and the face recognition system passband 218 is optional. In embodiments, due to manufacturing variations, which include the center frequency and width of the emitted spectrum band, the thermal variation of the IR light source, and other similar variations, tunable filter the passbands such as the passband from the LC/electrochromatic filter 210 may not be narrow. However, some tolerance can be introduced to the system and the passband can be made wider due to variations. If these variations are small enough and desired passband of each of a plurality of systems are wide enough apart, an optional stopband between each system passband can be used to define sharp stopbands for each system.

Figure 3A:
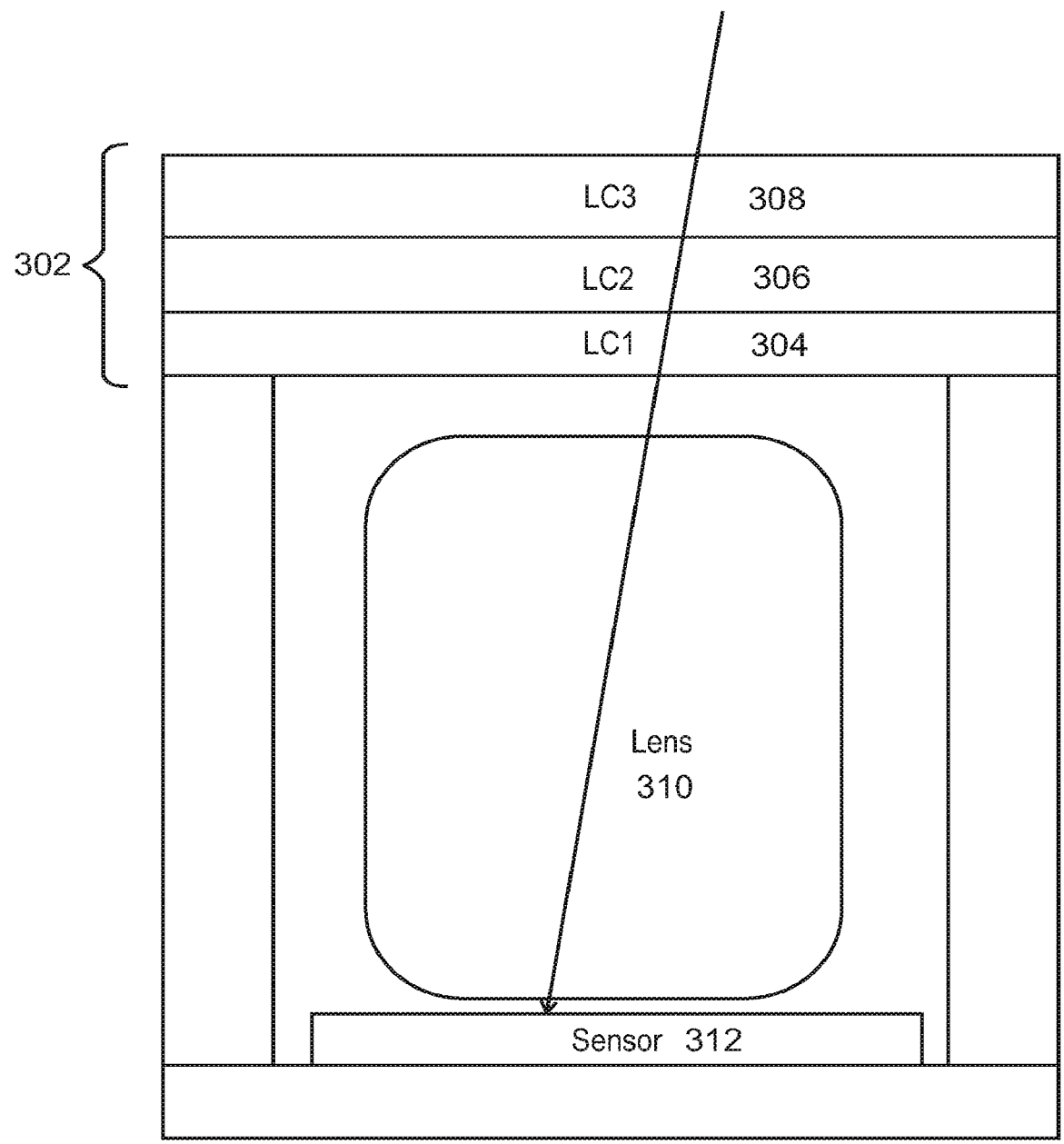
FIG. 3A is an illustration of a combined camera module with a liquid crystal adjustable filter.

FIG. 3A is an illustration of a combined camera module with liquid crystal adjustable filter 302. As illustrated, the LC adjustable filter 302 includes a liquid crystal layer. In embodiments, the liquid crystal layer may be about 5 um thick. The liquid crystal layer may include LC layer 1 304, LC layer 2 306, LC layer 3 308. Each layer of layers 304, 306, and 308 may be made reflective for certain wavelengths by selecting a combination of an excitation frequency, voltage, and LC material. In embodiments, crystal alignment and thickness will also affect the bandwidth of reflectance of the LC material. If the frequency is changed, the material changes to scattering or if the excitation is disabled the LC can become fully transmissive for all bandwidths. Thus, by selecting particular parameters, including an excitation voltage and frequency, the LC adjustable filter 302 may be reflective, transmissive, partially reflective, or partially transmissive. The light then passes through the lens 310 to an image sensor 312.

Figure 3B:
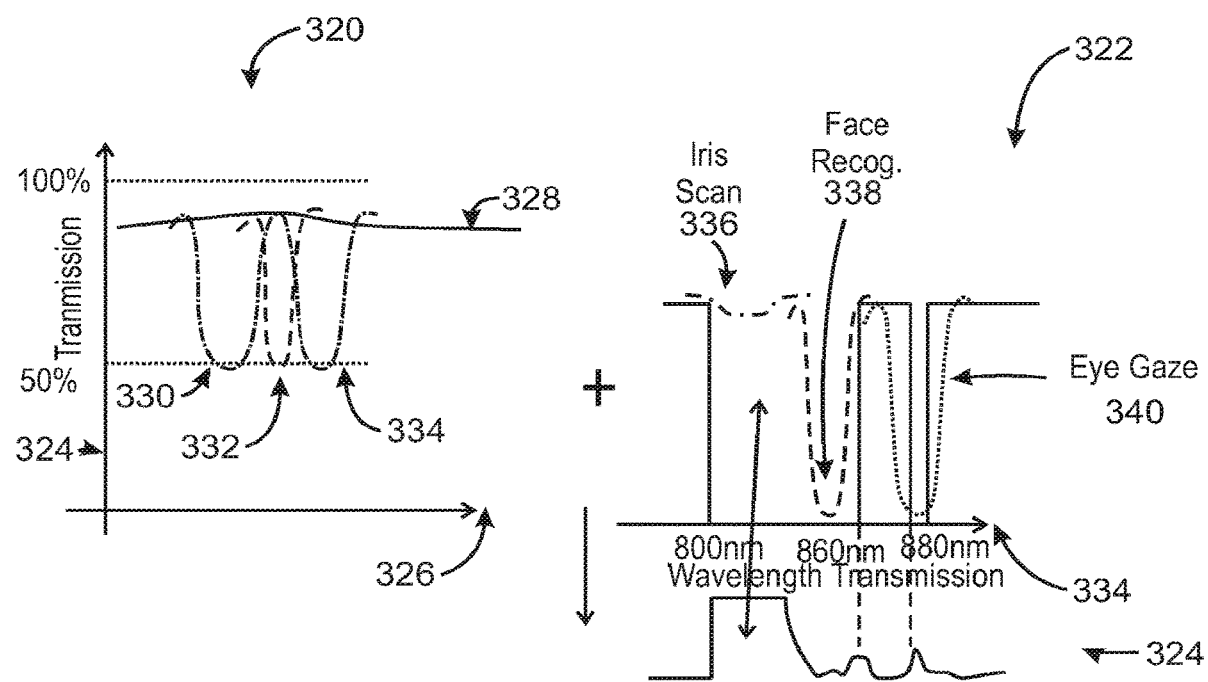
FIG. 3B is an illustration of a liquid crystal filter transmission levels graph and corresponding wavelength passbands.

FIG. 3B is an illustration of a liquid crystal filter transmission levels graph 320 and corresponding wavelength passbands 322. An excitation frequency and voltage may be applied to one or more layers of the LC/electrochromatic adjustable filter 302 to transmit infrared light as illustrated at the transmission levels graph 320. For example, the transmission levels graph 320 includes an x-axis 326 that represents the wavelength of light in nanometers (nm). A y-axis 324 represents a transmission percentage of infrared light.

When varying levels of voltage are applied to an LC/electrochromatic adjustable filter, all infrared light may be enabled to pass, as illustrated at reference number 328. At reference number 330, the transmission/reflectance level of wavelengths of an iris scan system is represented. At reference number 332, the transmission/reflectance level of wavelengths of a face recognition system is represented. Additionally, at reference number 334, the transmission/reflectance level of wavelengths of an eye gaze system is represented.

Based on the transmission/reflectance on the graph 320, various wavelengths are passed as illustrated by the passbands 322. The iris scan passband 336 begins at 800 nm. The face recognition passband 338 occurs around 860 nm. Additionally, the eye gaze passband 340 occurs around 880 nm. In embodiments, the iris scan passband is not made reflective. The result is a sharp transmission at the band defined by the IR band pass filter and passing IR scan LC sub-band as illustrated at reference number 324. In particular, the transmission at reference number 324 is a result of sharp cut off IR pass. It has small reflectance at the iris scan passband 336 since that layer has a non-ideal response. The iris scan passband response falls off according to response of the face recognition passband 338 reflectance. Accordingly, there are two small dips at reference number 336 where the face recognition passband reflectance starts to decline but the IR pass filter rejection band increases. The next dip is where the eye gaze passband 340 has small transmission as its reflectance may not be not ideal.

Accordingly, an LC film can be excited by a frequency that makes it reflective or scattering by another frequency. Without excitation, the LC film is fully transmissive. In embodiments, the reflectance of the LC is 50%, as it works for one polarization. One can add another for other polarization of light and make it 100% reflective. Bands for reflectance as narrow as 10 nm are possible by selecting polarizations parameters of various LC layers, such as the orientation of each layer with respect to the other layers. In order to filter both polarizations, two layers may be in a 90 ninety-degree perpendicular orientation to each other. As illustrated in FIG. 3A, there may be two separate LC systems or portions of LC material sandwiched between glasses that have their molecules aligned in perpendicular planes, i.e., each operating with one polarization component of light.

In some examples, a liquid crystal layer can be made reflective for certain wavelengths by selecting the excitation frequency, voltage, and LC material. For example, the LC layer can be 5 micrometers thick. In some examples, crystal alignment and thickness can also affect a bandwidth of reflectance. For example, differing reflectance can be achieved using different crystal alignments and layer thickness. In some examples, if a frequency is changed the material changes to scattering. In some examples, if excitation is disabled, the liquid crystal layer can be fully transmissive for all bandwidths. In some examples, a greatest reflectance for one liquid crystal layer can be 50% as the layer works through polarization. In some examples, a second liquid crystal layer can be added for another polarization of light and make the greatest reflectance for the two layers up to 100% reflective. In some examples, for narrow bands for reflectance, 10 micrometer thick liquid crystal layers can be used.

Figure 2B:
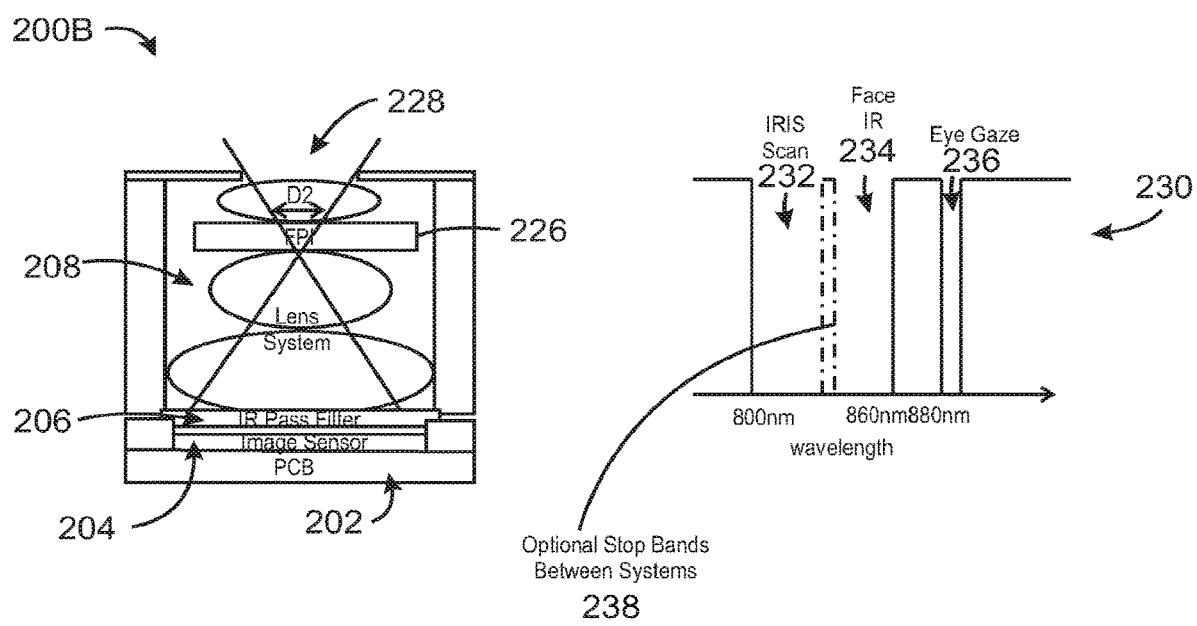
FIG. 2B is an illustration of a single camera system 200B that implements a plurality of technologies.

Referring now to FIG. 2B, a single camera system 200B that implements a plurality of technologies is illustrated. Similar to FIG. 2A, the camera system 200B includes a PCB 202, an image sensor 204, and IR pass filter 208, and a lens system 208. However, the local opening 228 of the camera system 200B may be implemented using a Fabry-Perot interferometer (FPI) 226.

An optical system typically has many openings, or structures that limit the ray bundles, where ray bundles are also known as pencils of light. These structures may be the edge of a lens, or a ring (sheet that limits light through circular ring), or other fixture that holds an optical element in place. In some cases, a special element such as a diaphragm may be placed in the optical path to limit the light admitted by the system.

Generally, these structures are called stops, and the aperture stop is the stop that primarily determines the ray cone angle and brightness at the image point. Sometimes stops and diaphragms are referred to as apertures, even when they are not the aperture stop of the system. Accordingly, there could be smaller aperture that defines the limits of light that reaches a sensor. While the opening 228 may define an aperture of the camera system 200B, the opening 228 is not necessarily the aperture stop of the system 200B.

The FPI 226 can have a passband as narrow as 10-15 nm with accuracy of +−1 nm for the center peak of passband. The passband of the FPI 226 may be referred to as full width half maximum (FWHM). The switching speed of the FPI 226 is below 10 ms or faster. The speed of switching between passbands varies depending design approach. FPIs however require that incident angles are within +/−5 degrees. Aperture at range of 1-4 mm exists today. The present techniques include additional optics in case a larger than +/−5 FOV is required, which may be the case in some embodiments.

Figure 4A:
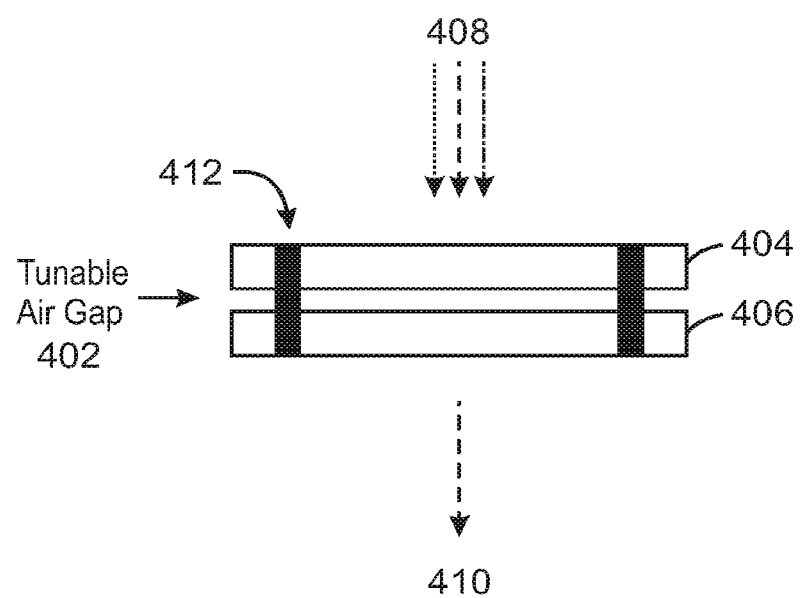
FIG. 4A is an illustration of the implementation of an Fabry-Perot interferometer.

FIG. 4A is an illustration of the implementation of a Fabry-Perot interferometer 400A. The FPI 400A may include an actuator 412 that is to adjust the size of a tunable air gap 402. In embodiments, the actuator 412 may be a MEMS electrostatic actuator or a piezo-electric crystal actuator. The actuator 412 may be used to control a spectrum of light passing through the FPI 400A by changing the distance between a pair of mirrors 404 and 406. This can be done by either moving both or at least one of the mirrors 404 and 406. As the distance 402 between mirrors 404 and 406 changes, the passband will shift as a function of excitation of the actuator. Excitation of the actuator will cause the mirrors 404 and 406 of the FPI 400 to move relative to each other. The incident angle is changed as a result of this movement, resulting in a passband shift. Accordingly, incoming light 408 may be broadband or white light. After passing through the FPI 400A, the transmitted light 410 has a narrow wavelength band.

In embodiments, the FPI 400A consists of two mirrors separated by a distance. In its simplest form, the FPI may be a slab or an etalon where incident light is reflected back and forth between the etalon faces, thus forming constructive and destructive standing wave conditions for a certain wavelength. In effect, the FPI 400A transmits certain narrow wavelength bands while blocks the others. A tunable filter can be constructed by placing two mirrors close to each other while adjusting the gap between them. That is where the parallelism of the optical gap and the precision of gap adjustment become critical. The spectral resolution of the FPI 400A depends on the reflectivity of the mirrors and the gap between the mirrors while the passed wavelengths depend only on the gap. In the FPI 400A, the resolution and the Free Spectral Range, i.e. the distance between two multiple order passbands, are inversely related—having a very high resolution results in a very small working range and vice versa.

In embodiments the FPI 400A can have passband as narrow as 10-15 nm with accuracy of +/−1 nm. In embodiments, the passband may also be referred to as a full width half maximum (FWHM) band. The switching speed of the FPI 400A is below 10 ms or faster. As used herein, the switching speed refers to the speed at which the passband is changed. The speed varies depending design approach of the FPI. FPIs however require that incident angles are within +−5 degrees.

As noted above, the actuator 412 may be a MEMS electrostatic actuator or a piezo-electric crystal actuator. In embodiments, the MEMS based FPI may be a mass-producible optical MEMS (MOEMS) based FPI as described in "Tunable MOEMS Fabry-Perot Interferometer for Miniaturized Spectral Sensing in Near-Infrared" by Rissanen et al., VTT Technical Research Centre of Finland, Tietotie 3, Espoo, Finland in Proc. of SPIE 2014. Thus two different manufacturing platforms exist for FPIs: optical MEMS-based chips (MOEMS FPI or MEMS FPI) and the separately assembled piezo-actuated tunable filter modules (Piezo FPI or PFPI). These two platforms enable sensing solutions for both high-volume MOEMS applications as well as customized high performance PFPI optical instruments.

In PFPI modules found in broadband hyperspectral imagers, large optical apertures up to 15 mm in size can be realized due to the robust, thick mirror substrates on which the thin-film reflectors are deposited and then assembled together using commercial piezo actuators. MEMS FPIs are tunable optical filters, which enable miniaturization of spectral imagers into small, mass producible hand-held sensors with versatile optical measurement capabilities. These MEMS based FPIs are also very robust with regard to mechanical shock. Until now, these many application demonstrations have been mostly realized with piezo-actuated FPIs fabricated by non-monolithical assembly method, suitable for achieving very large optical apertures and with capacity to small-to-medium volumes. However large-volume production of MEMS manufacturing supports the potential for emerging applications also in large-volume applications, such as in consumer/mobile products.

Accordingly, two techniques can be used to realize an FPI according to the present techniques. First, a MEMS base FPI, where mirrors are actuated by an electrostatic actuator and second, a PFPI where mirror distance is actuated by piezo actuator. With the PFPI, the manufacturing process is a non-monolithical assembly method, contrary to full monolithic process of MEMS. As used herein, monolithic refers to the whole structure being processed in semiconductor process on a wafer.

In embodiments, MEMS Fabry-Perot interferometers (FPIs) are tunable optical filters, which enable miniaturization of spectrometers into mass producible hand-held sensors with versatile measurement capabilities. The Fabry-Perot interferometer consists of two reflective mirror surfaces, typically thin film Bragg reflectors, with a gap between the mirrors and integrated electrodes within the membrane structure. The passband wavelength of the filter is tuned by adjusting the distance between the mirrors.

An aperture at range of 1-4 mm exists today. There also other sources and these systems will emerge in coming years. Thus on top of FPI one needs to place additional optics in case larger than +/−5 FOV is required (as it is in this case). If alpha angle is too large the transmission goes zero. The alpha angle is the incident angle. The challenge of increasing size of the optical aperture of a MEMS structure arises from the extremely high aspect ratios. Increasing the size of optical aperture up to 4 mm with the tuning electrodes surrounding the aperture means the entire released membrane needs to be more than 5 mm. The typical air gap of visible wavelength FPI is of the order of 1.6 µm, thus resulting in a several mm-diameter membranes separated with µm-range gap.

Figure 4B:
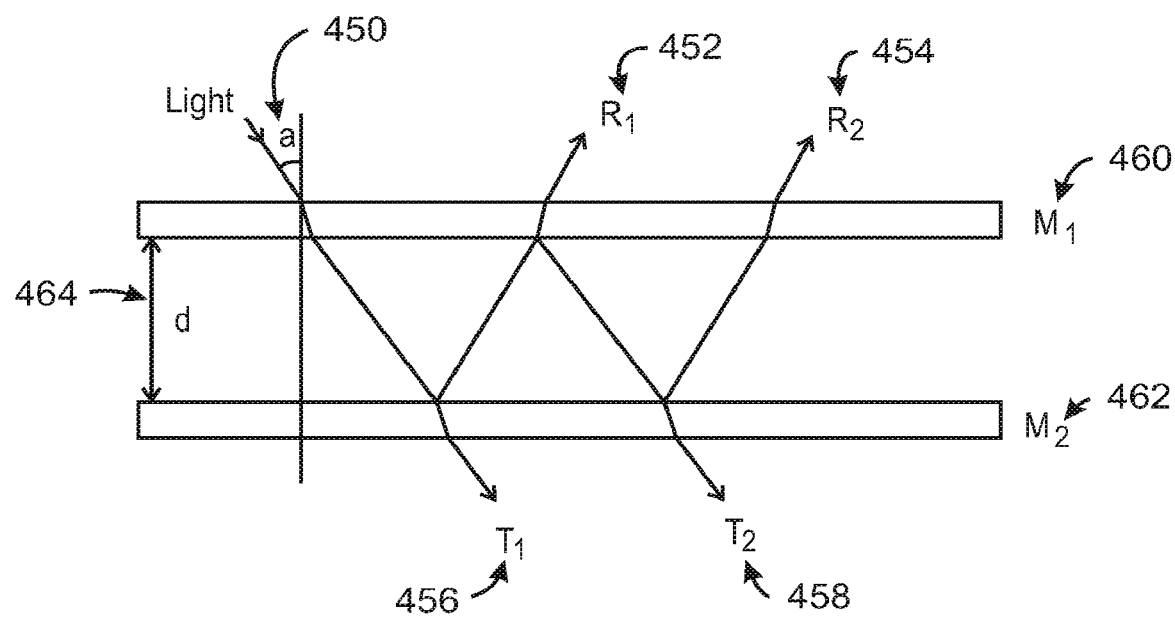
FIG. 4B is an illustration of the incident angles of an FPI.

FIG. 4B is an illustration of the incident angles of an FPI. In FIG. 4B, and incident angle a 402 is illustrated. R1 452 is a first reflected wavelength, R2 454 is a second reflected wavelength, T1 is a first transmitted wavelength, and T2 is a second transmitted wavelength. Additionally, M1 460 is a first mirror and M2 462 is a second mirror, where the mirror M1 460 and the mirror M2 462 are separated by a distance d 464.

Figure 4C:
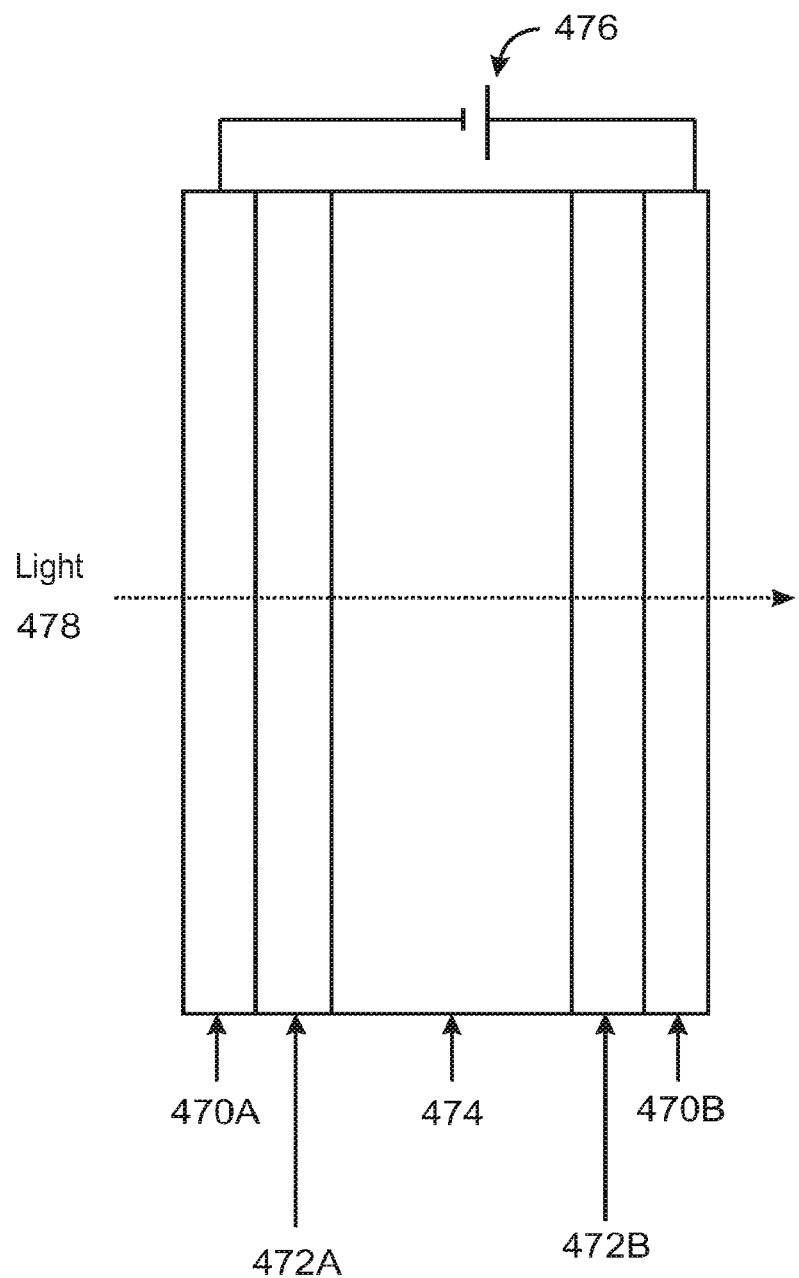
FIG. 4C is an illustration of an electrochromic filter/device with multiple layers.

FIG. 4C is an illustration of an electrochromic filter/device 400C with multiple layers. The electrochromic filter/device 400C includes a transparent electrode 470A, a transparent electrode 470B, a first electrochromic layer 472A, a second electrochromic layer 472B, and an electrolyte layer 474. A voltage 476 may be applied to each transparent electrode 470A and transparent electrode 470B, thereby controlling the wavelengths of light 478 that are allowed to pass. In embodiments, three pieces of glass—one for first NIR band, another for second infrared band, and so on may be cemented together. Typical electrochromic structures use an electrochromic liquid, polymer or gel such as the electrolyte 474 captured between two layers of transparent substrate, such as glass or plastic as represented by transparent electrodes 470A and 470B. Electrodes allow a potential to be applied to the liquid, polymer or gel to achieve the desired effect. Electrochromic material will absorb the certain wavelengths when activated.

Figure 4D:
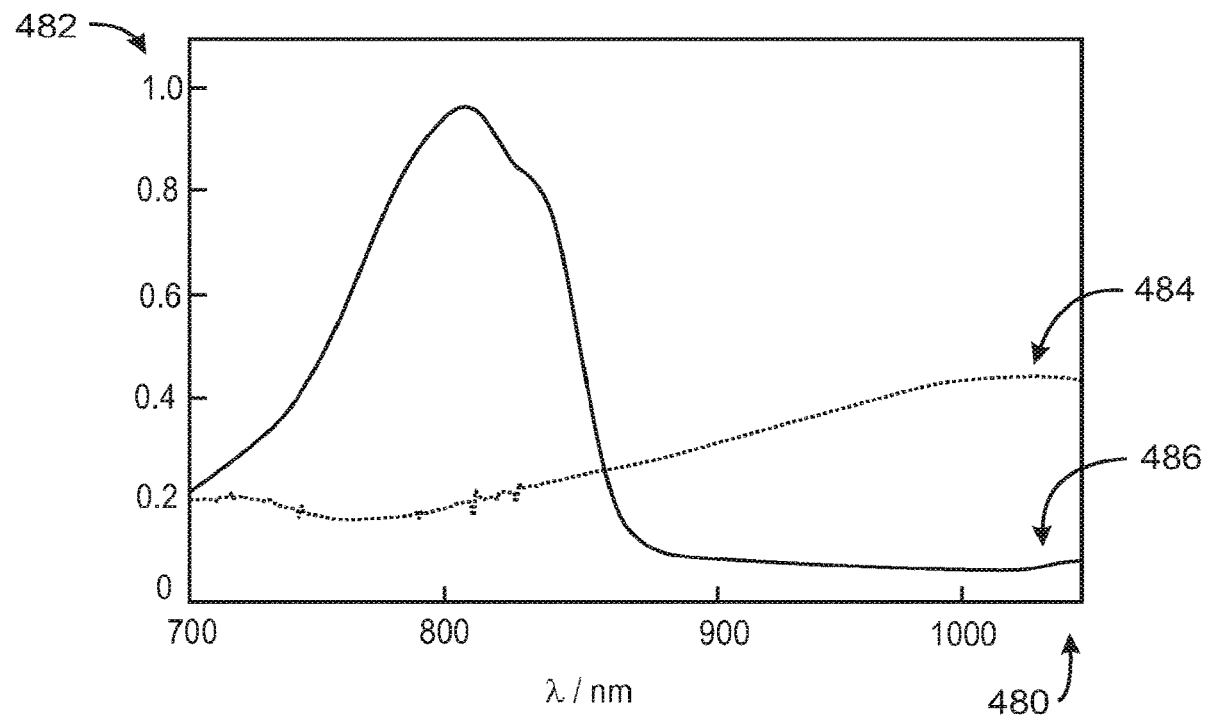
FIG. 4D is a graph that illustrates the wavelengths of light allowed to pass with varying potentials applied an electrochromic filter/device.

FIG. 4D is a graph 400D that illustrates the wavelengths of light allowed to pass with varying potentials applied to an electrochromic filter/device. The x-axis 480 of the graph 400D represents the wavelength allowed to pass, while the y-axis 482 represents the potential applied to an electrolyte layer. By applying different potentials to the electrolyte layer, various levels of transmission on absorbance can be obtained as illustrated by line 484 and line 486.

The present techniques describe the combination of separate biometric recognition applications into a single hardware unit. Recognition applications such as face recognition can require ambient free IR as discussed above. Their algorithm which is standard API is expecting such a format, and thus it would be advantageous to have ambient free IR with a CMOS rolling shutter sensor as well. This can be done so that one global shutter frame is taken without IR light. This helps to remove the ambient IR levels from signal. A benefit of the global shutter sensor is that timing of IR flash is very accurate and there are no limitations on in timings of rolling shutter, like exposure time and number of rows and interface speed i.e. readout-time, within specified frame rate.

The present techniques enable the use of a rolling shutter sensor but in global reset mode. This means that all rows of the rolling shutter are reset in same time, and exposed for some same time. After desired exposure time the controller gives command for tunable IR pass filter to change its passband. This happens in short time e.g. in 1 ms. Pixels can be read in any time as they are not any more exposed to IR. All frames are started with a global reset. After exposure time, the IR filter passband is changed on the rejection band of IR PASS filter which is out of application bands of the face scan application.

Figure 5A:
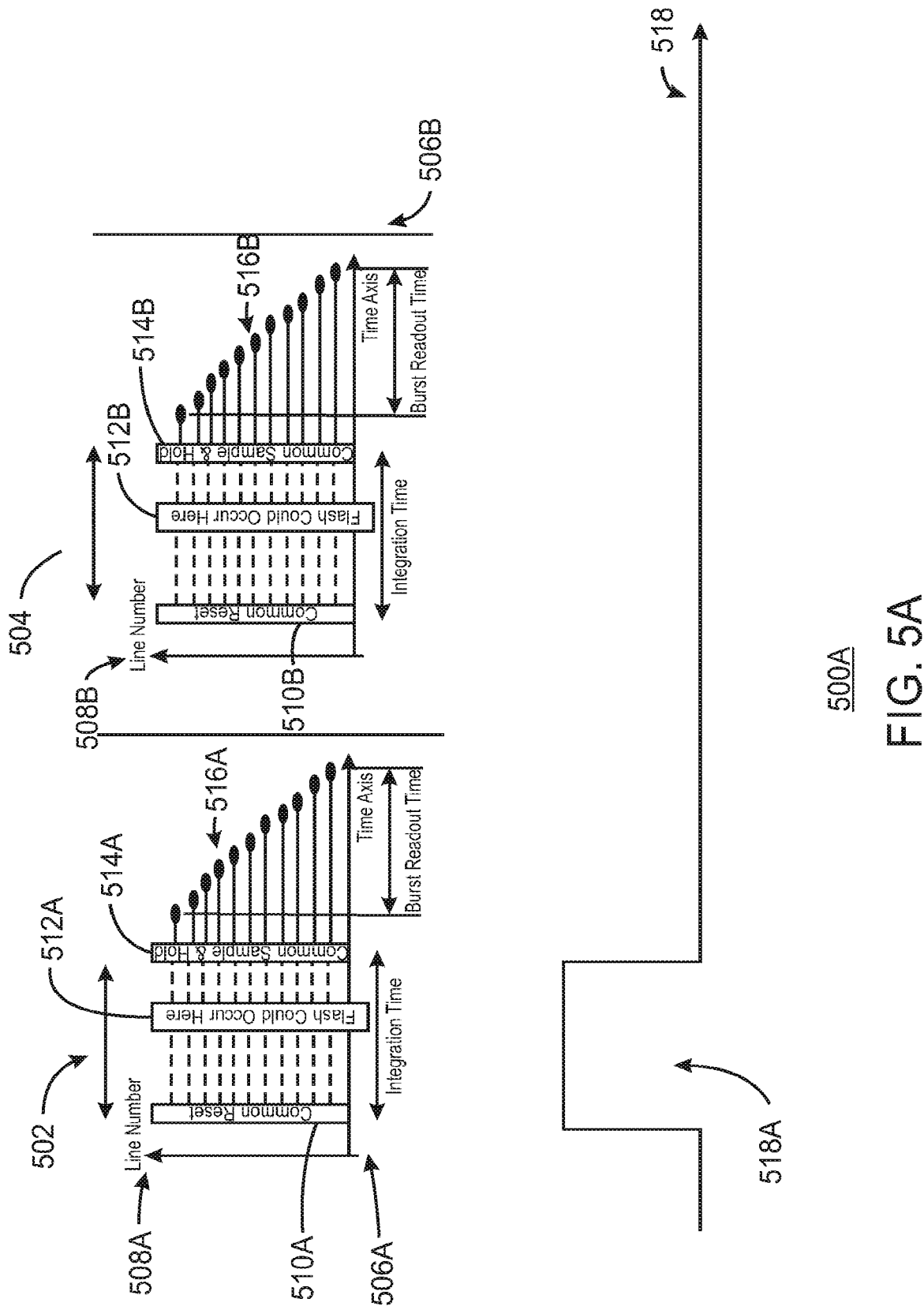
FIG. 5A is an illustration of ambient free IR with a global shutter.

FIG. 5A is an illustration of ambient free IR with a global shutter. Reference number 502 illustrates the capture of a frame one, and reference number 504 illustrates the capture of a frame two. An x-axis 506A and 506B represents time for each frame. A y-axis 508A and 508B represents a line number for each frame.

As illustrated, in frame 1 502, a command reset 510A occurs to reset each line of the rolling shutter. During the integration time represented by the dashed lines, the flash could occur at any time. Thus, the IR light pulse could occur at any time 512A after the common reset 510A. While the IR pulse can be at any time, it does not need to be any longer than the actual integration time. In embodiments, the IR pulse is the same as the actual integration time as all IR outside of IR flash pulse is considered noise. The integration time, as described herein, is the time between a common reset and the common sample and hold.

A common sample and hold occurs at reference number 514A. At this moment, the change on all pixels is moved to a storage capacitor which keeps the change signal stabile during readout of all pixels. After the common sample and hold, a burst readout time occurs as indicated by the solid lines 516A. Similarly, in frame 2 504, the ambient IR frame is captured. A command reset 510B occurs to reset each line of the rolling shutter. During the integration time represented by the dashed lines, ambient IR is integrated. A common sample and hold occurs at reference number 514B. After the common sample and hold, a burst readout time occurs as indicated by the solid lines 516B. Ambient IR is thus sensed and this image can be later derived from the first frame that is sum of ambient and IR flash illumination. Put another way, the second may be subtracted from the first frame to obtain ambient free IR. Accordingly, the rolling shutter sensor may be a sensor that implements a shutter such that an image or frame of video is captured by scanning across the scene rapidly, either vertically or horizontally. With a global shutter sensor, every pixel of an image or frame of video is exposed simultaneously at the same instant in time. The line 518 illustrates a period of time 518A where the IR pulse occurs in the first frame 502 in order to capture the ambient free IR. At line 518, a capture occurs with help or IR pulse/flash with both IR flash and ambient IR present. At frame 504, only the ambient IR light is present and no additional IR flash light is present. The frame 504 is then subtracted from the frame 502 to obtain an ambient IR free image.

In FIG. 5A, all pixels are exposed at same time. No motion artifacts occur, and the same ambient condition exists for each pixel. Moreover, there is a high frame rate with accurate ambient and IR. Additionally, the IR light source duration is short which results in a lower number of thermal issues and lower power consumption due to accurate conditions of the coordinated ambient and IR integration time. The ambient IR capture and the IR integration time can also be different as ratio is known and taken account in ambient subtraction operation.

Figure 5B:
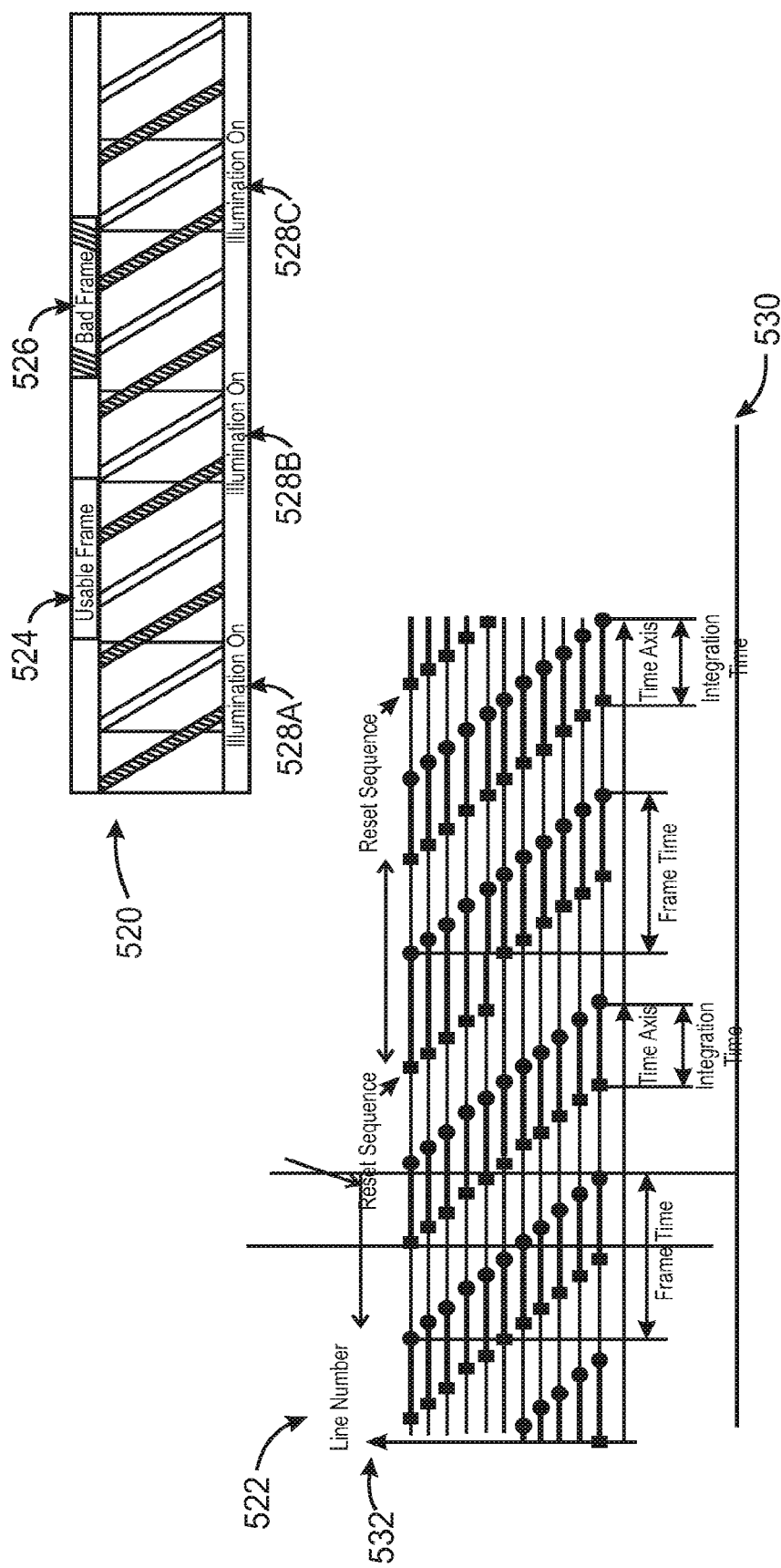
FIG. 5B is an illustration of the read out of a rolling shutter sensor.

FIG. 5B is an illustration 500B of the read out of a rolling shutter sensor. As discussed above, the rolling shutter sensor differs from the global shutter sensor in that it does not have storage capacitor. Thus the signal needs to be read right after desired integration time. At reference number 522, a plurality of lines 532 are illustrated that represent the pixels of an image along a time line 530. As illustrated, each line is read right after its integration time ends, and then the line is reset. In embodiments, all lines are not reset simultaneously, as the limited readout speed would lead to unequal integration time of each line as signal would continue to be integrated because it is not moved to storage capacitor. The lines are also reset at different times, which can be called rolling reset. The rolling resets are illustrated as squares along each line 532, with the transfer to a storage capacitor represented by a circle along the lines 532. In order for all have the same integration of IR pulse, the pulse should be starting from the moment of first line start until end of the last line. This time is longer than integration time of each row because it also comprises the readout time of whole frame limited by reading speed and conversion speed of signal in sensor to digital and interface limitations.

The IR pulse thus needs to be on a longer time than in a global reset sensor. Additionally, the next frame's first line integration typically starts already the last line of previous frame has been exposed. This means that next frame may be corrupted as part of the lines in image will be illuminated by the IR pulse and part of that with ambient only. This frame is bad and needs to be discarded. Thus, the IR pulse sequence 520 shows various illumination on 528A, 528B, and 528C where the IR pulse occurs. The frame 524 is a useable frame, however the frame 526 should be discarded. A third frame could be the ambient (no IR flash) frame, but again a fourth frame has already started before last line exposed fully from third frame and fourth frame would be to be discarded as that is partly ambient-only exposed so flash cannot be fired for it. A fifth frame in this sequence would again be an IR flash pulsed frame.

Figure 5C:
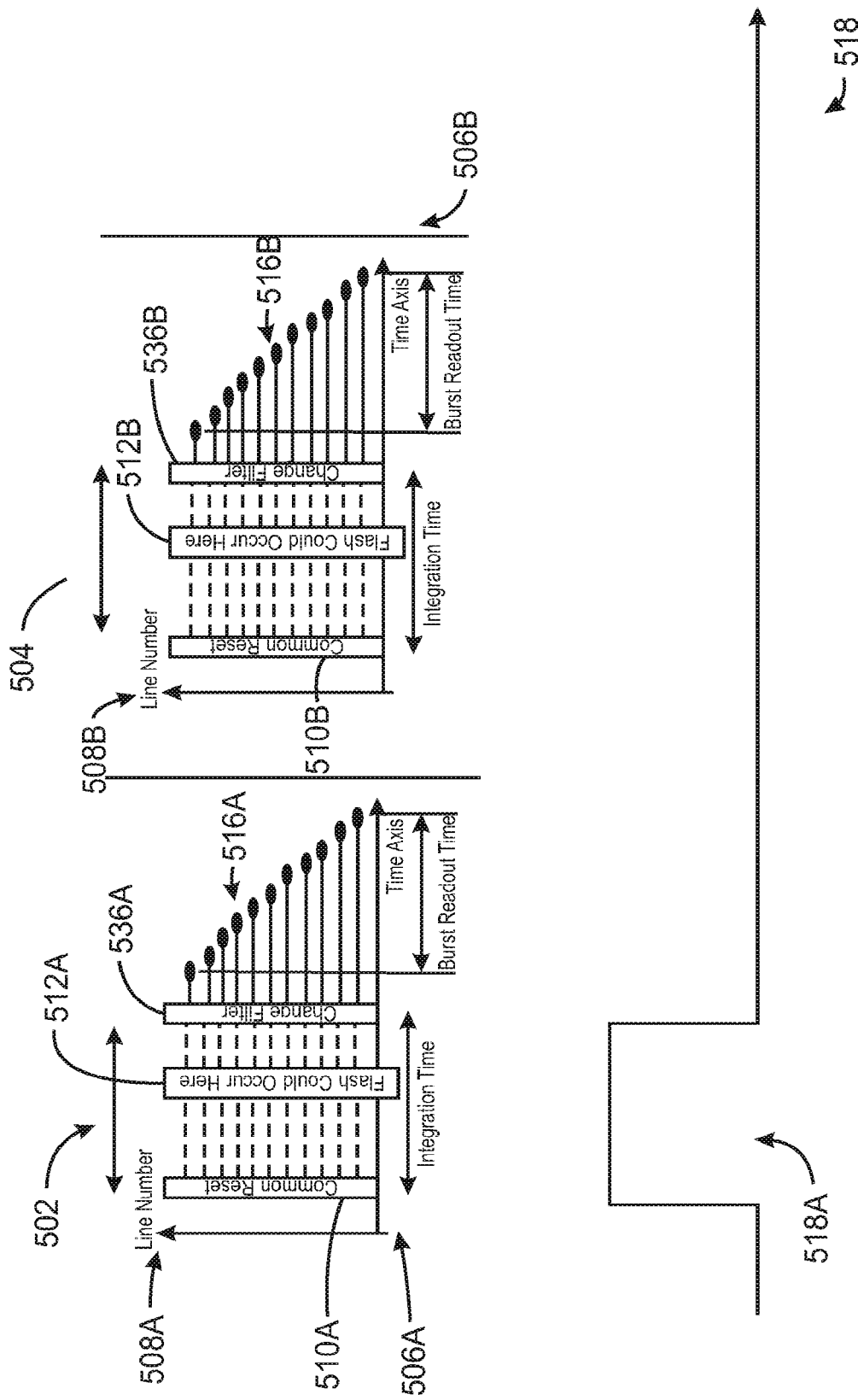
FIG. 5C is an illustration of ambient free IR with a global shutter with a CMOS rolling shutter sensor.

FIG. 5C is an illustration 500C of ambient free IR with a global shutter with a CMOS rolling shutter sensor. FIG. 5C is similar to FIG. 5A. However, the change filter 536A and 5366 enables a CMOS rolling shutter sensor to be used. The CMOS rolling shutter implementation has a global reset feature and it is usable as pixels are non-exposed by light as the adjustable filter is used as "global shutter." Put another way, the adjustable filter is changed to realize the global shutter. When the illumination and integration time have elapsed, the filter passband is set outside of desired band and no signal is received. All lines can be thus read without getting unwanted excess integration of light.

Figure 5D:
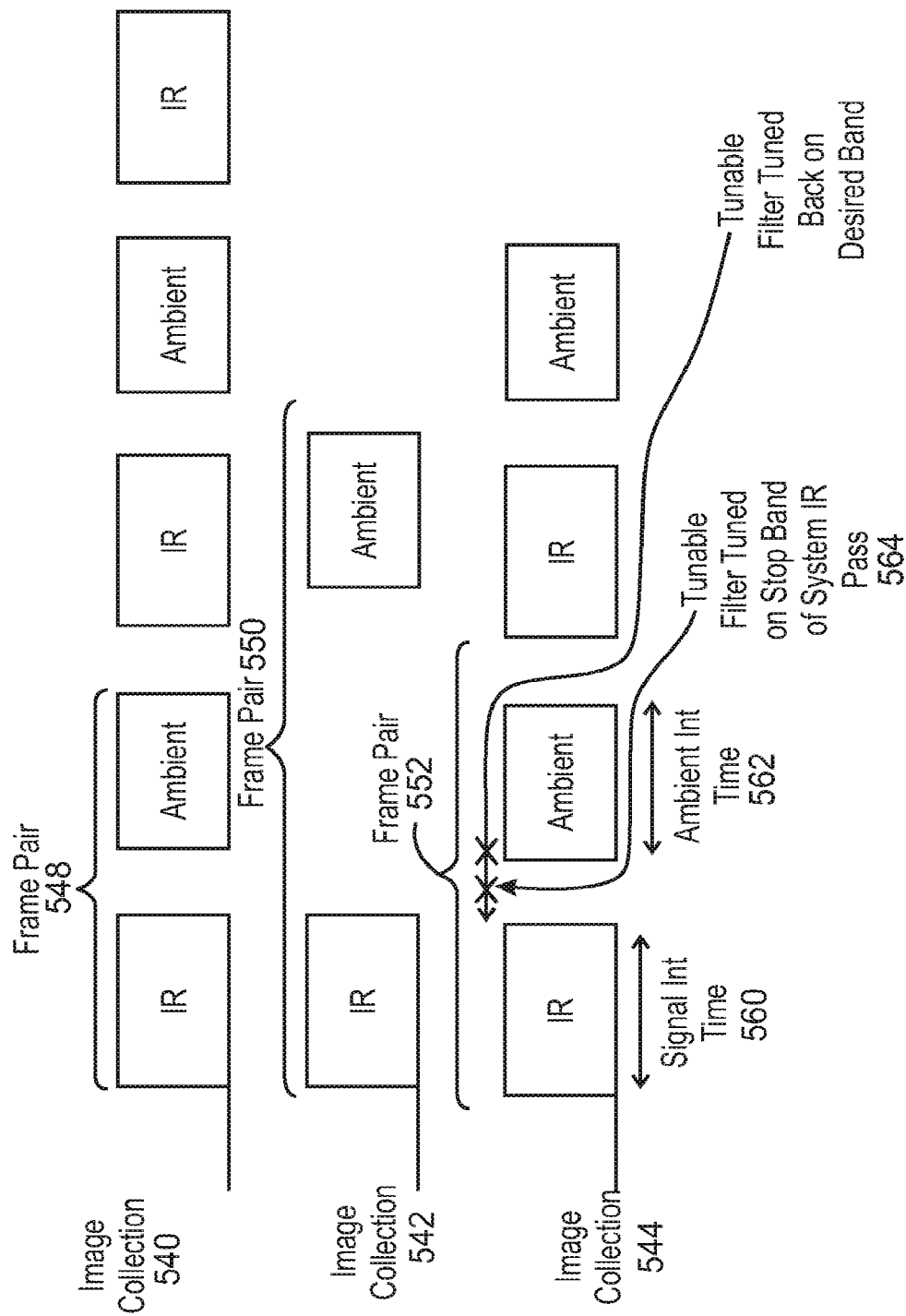
FIG. 5D is an illustration of frame rates for various systems.

FIG. 5D is an illustration of frame rates for various systems. The image collection system 540 represents a system with a frame rate with a global shutter sensor. The image collection system 542 represents a system with a rolling shutter, and the image collection system 544 represents a system with a rolling shutter with global reset and tunable filter as described in FIG. 5C. The frame rate of the image collection system 540 is the same as the frame rate of the image collection system 544. However, the frame rate of the image collection system 542 leads to lower frame rate and there is unusable wait time due to two discarded frames. The two system are approximately equal when the filter can be set to on-off in relative short time compared to the readout time and back to on desired band for next frame that is much shorter than frame time. The duration to move the passband back on to the face IR passband would directly add to overall time used for one frame.

Figure 6:
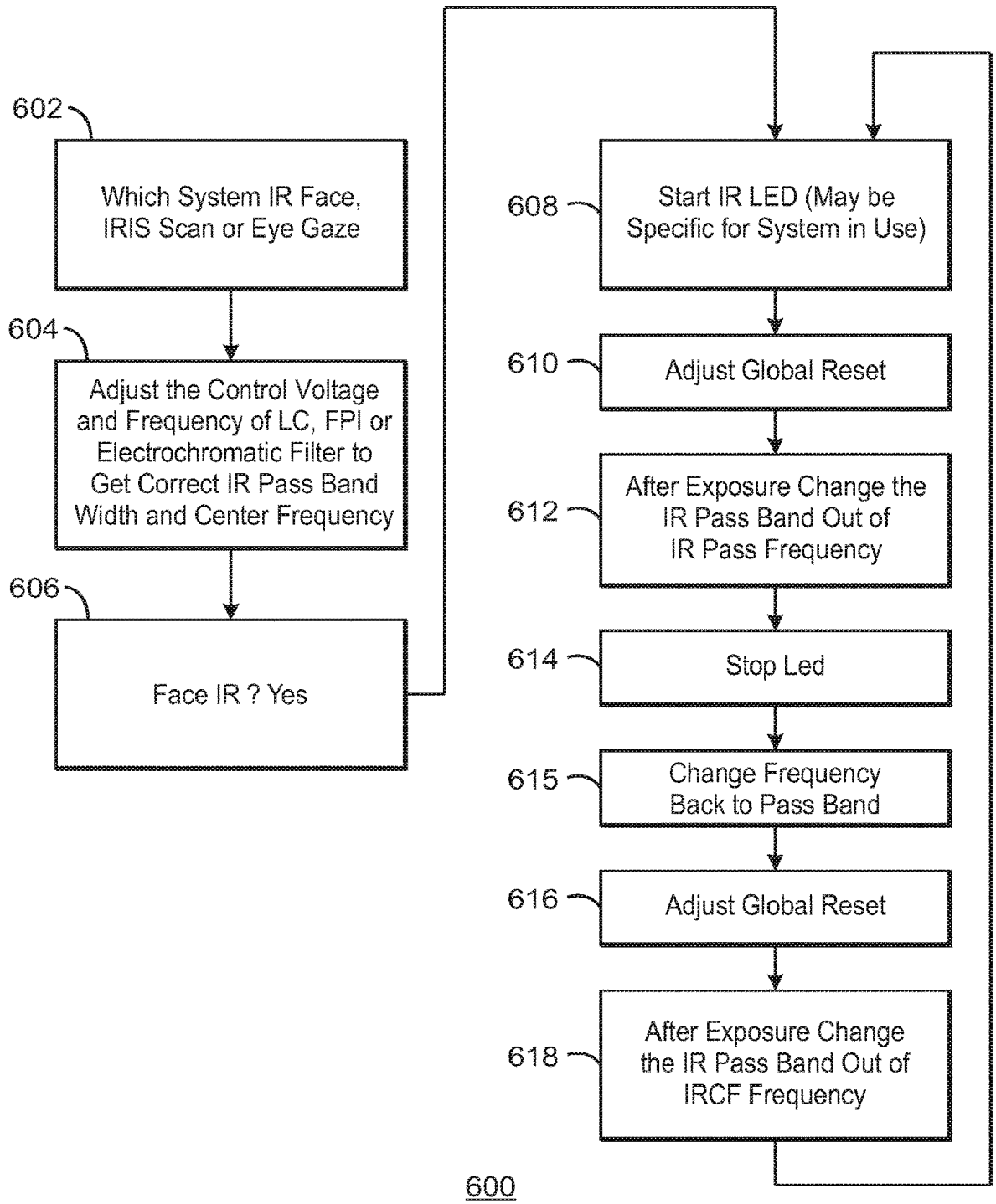
FIG. 6 is a process flow diagram of a method 600 for a combined camera system module.

FIG. 6 is a process flow diagram of a method 600 for a combined camera system module. At block 602, the camera system to be implemented is determined. In examples, the system to be implemented may be one of a face recognition, iris scan, or eye gaze system.

At block 604, the control voltage and/or frequency of the LC filter, FPI, or electrochromatic filter is adjusted to obtain the IR passband width and center frequency that corresponds to the system selected at block 602. As used herein, the center frequency is the center frequency of the passband of a tunable filter. At block 606, it is determined if the camera system to be implemented is face recognition. If face recognition is to be implemented, process flow continues to block 608.

At block 608 an IR LED is started. In embodiments, the IR LED is a NIR LED with a wavelength spectrum at approximately 700-1200 nm. At block 610, the global reset is adjusted. As discussed above, the global reset may be adjusted using a rolling camera shutter system. At block 612, after the exposure, the passband of the tunable filter is changed to be the stop band of an IR pass filter. Alternatively, the tunable filter may be adjusted such that there is a low sensitivity in case an IR pass filter is not present.

At block 614, the LED is stopped. At block 615, the frequency is changed back to the IR passband. At block 616, the global reset is adjusted. At block 618, after the exposure, change the IR passband out of the IRCF frequency. In embodiments, the global reset is adjusted a second time to obtain an image. Specifically, a first frame with IR illumination is captured, and a first reset is applied. A second frame is captured without IR light where only ambient IR light is present. Then unilluminated second frame is subtracted from the illuminated first frame and an ambient free IR frame is obtained. In this manner, a clean and consistent image is obtained, regardless of the ambient lightning, weather, or even complete darkness. This ambient IR technique results in a better tolerance for changes in the face, such as facial hair and cosmetic makeup, with no need for multiple enrollments resulting in a better user experience.

This process flow diagram is not intended to indicate that the blocks of the example process 600 are to be executed in any particular order, or that all of the blocks are to be included in every case. Further, any number of additional blocks not shown may be included within the example process 700, depending on the details of the specific implementation.

Figure 7:
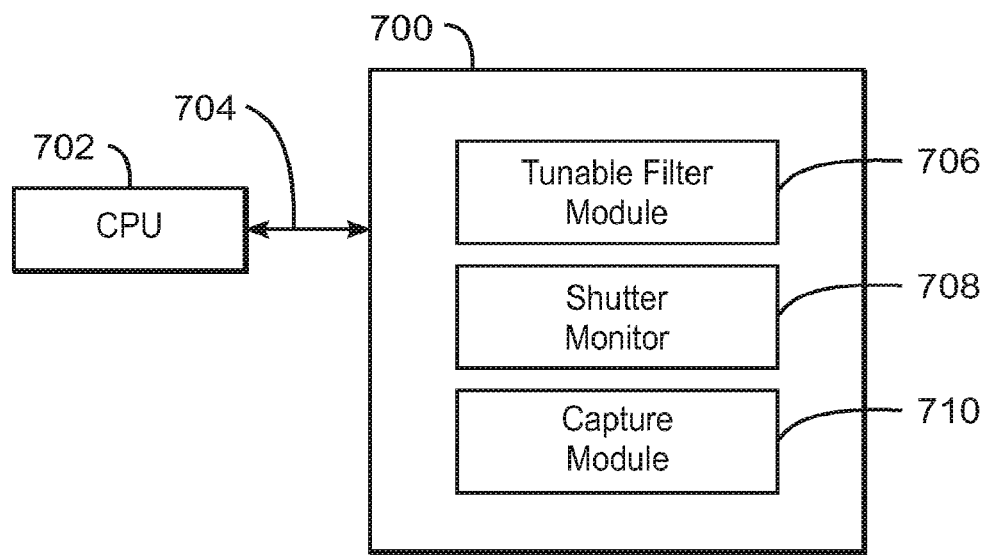
FIG. 7 is a block diagram showing a medium 700 that contains logic for enabling a combined IR capture system.

FIG. 7 is a block diagram showing a medium 700 that contains logic for enabling a combined IR capture system. The medium 700 may be a computer-readable medium, including a non-transitory medium that stores code that can be accessed by a processor 702 over a computer bus 704. For example, the computer-readable medium 700 can be volatile or non-volatile data storage device. The medium 700 can also be a logic unit, such as an Application Specific Integrated Circuit (ASIC), a Field Programmable Gate Array (FPGA), or an arrangement of logic gates implemented in one or more integrated circuits, for example.

The medium 700 may include modules 706-710 configured to perform the techniques described herein. For example, a tunable module 706 may be configured to determine a passband that corresponds to a biometric capture application. The tunable module 706 may also adjust a voltage and frequency of an adjustable filter in response to the capture application and associated passband. A shutter module 708 may be configured to implement a global shutter system via a rolling shutter system in response to a face recognition capture application. A capture module 710 may be configured to capture IR images. In some embodiments, the modules 706-710 may be modules of computer code configured to direct the operations of the processor 702.

The block diagram of FIG. 7 is not intended to indicate that the medium 700 is to include all of the components shown in FIG. 7. Further, the medium 700 may include any number of additional components not shown in FIG. 7, depending on the details of the specific implementation.

Example 1 is an apparatus for a combined camera system. The apparatus includes an adjustable pass filter, wherein a passband of the filter is electrically adjusted; and a rolling shutter sensor, wherein an adjustable filter is to implement a global shutter and a rolling shutter sensor global reset.

Example 2 includes the apparatus of example 1, including or excluding optional features. In this example, the adjustable pass filter is a tunable IR pass filter.

Example 3 includes the apparatus of any one of examples 1 to 2, including or excluding optional features. In this example, the adjustable pass filter is a liquid crystal filter. Optionally, the liquid crystal filter comprises a plurality of liquid crystal layers, wherein each layer is to reflect or transmit certain passbands.

Example 4 includes the apparatus of any one of examples 1 to 3, including or excluding optional features. In this example, the adjustable pass filter is an electrochromatic filter.

Example 5 includes the apparatus of any one of examples 1 to 4, including or excluding optional features. In this example, the adjustable pass filter is a Fabry-Perot interferometer (FPI). Optionally, the Fabry-Perot interferometer (FPI) changes the passband as a function of excitation of an actuator. Optionally, the Fabry-Perot interferometer (FPI) is a micro-electro-mechanical (MEMS) Fabry-Perot interferometer (FPI). Optionally, the Fabry-Perot interferometer (FPI) is a piezo-actuated Fabry-Perot interferometer (FPI).

Example 6 includes the apparatus of any one of examples 1 to 5, including or excluding optional features. In this example, the apparatus includes an IR filter, wherein the IR filter is to provide a sharp cutoff band to refine the adjustable passband of the adjustable pass filter.

Example 7 includes the apparatus of any one of examples 1 to 6, including or excluding optional features. In this example, the adjustable pass filter is adjusted for a passband that corresponds to a biometric recognition application.

Example 8 includes the apparatus of any one of examples 1 to 7, including or excluding optional features. In this example, the adjustable IR pass filter is adjusted for a passband that corresponds to a face recognition, iris scan, or eye gaze application on the fly.

Example 9 is a method for implementing a combined IR capture system. The method includes determining a passband that corresponds to a biometric capture application; adjusting a voltage and frequency of an adjustable pass filter in response to the capture application and associated passband; and in response to a face recognition capture application, implementing a global shutter system and a rolling shutter sensor global reset.

Example 10 includes the method of example 9, including or excluding optional features. In this example, the biometric capture application is one of a face recognition, iris scan, or eye gaze application.

Example 11 includes the method of any one of examples 9 to 10, including or excluding optional features. In this example, a second filter is to refine the passband via a plurality of stopbands.

Example 12 includes the method of any one of examples 9 to 11, including or excluding optional features. In this example, the adjustable pass filter is a liquid crystal filter. Optionally, the liquid crystal filter comprises a plurality of liquid crystal layers, wherein each layer is to reflect or transmit particular passbands.

Example 13 includes the method of any one of examples 9 to 12, including or excluding optional features. In this example, the adjustable pass filter is an electrochromatic filter.

Example 14 includes the method of any one of examples 9 to 13, including or excluding optional features. In this example, the adjustable pass filter is a Fabry-Perot interferometer (FPI). Optionally, the Fabry-Perot interferometer (FPI) changes the passband as a function of excitation of an actuator.

Example 15 includes the method of any one of examples 9 to 14, including or excluding optional features. In this example, the adjustable pass filter is a micro-electro-mechanical (MEMS) Fabry-Perot interferometer (FPI).

Example 16 includes the method of any one of examples 9 to 15, including or excluding optional features. In this example, the adjustable pass filter is a piezo-actuated Fabry-Perot interferometer (FPI).

Example 17 includes the method of any one of examples 9 to 16, including or excluding optional features. In this example, the global reset is applied to the rolling shutter system after each face recognition capture.

Example 18 is a system for a combined IR capture system. The system includes a display; a camera; a memory that is to store instructions and that is communicatively coupled to the camera and the display; and a processor communicatively coupled to the camera, the display, and the memory, wherein when the processor is to execute the instructions, the processor is to: determine a passband that corresponds to a biometric capture application; adjust a voltage and frequency of an adjustable pass filter in response to the capture application and associated passband; and in response to a face recognition capture application, implement a global shutter system and a rolling shutter sensor global reset.

Example 19 includes the system of example 18, including or excluding optional features. In this example, the biometric capture application is one of a face recognition, iris scan, or eye gaze application.

Example 20 includes the system of any one of examples 18 to 19, including or excluding optional features. In this example, a second filter is to refine the passband via a plurality of stopbands.

Example 21 includes the system of any one of examples 18 to 20, including or excluding optional features. In this example, the adjustable pass filter is a liquid crystal filter. Optionally, the liquid crystal filter comprises a plurality of liquid crystal layers, wherein each layer is to reflect or transmit particular passbands.

Example 22 includes the system of any one of examples 18 to 21, including or excluding optional features. In this example, the adjustable pass filter is an electrochromatic filter.

Example 23 includes the system of any one of examples 18 to 22, including or excluding optional features. In this example, the adjustable pass filter is a Fabry-Perot interferometer (FPI). Optionally, the Fabry-Perot interferometer (FPI) changes the passband as a function of excitation of an actuator.

Example 24 includes the system of any one of examples 18 to 23, including or excluding optional features. In this example, the adjustable pass filter is a micro-electro-mechanical (MEMS) Fabry-Perot interferometer (FPI).

Example 25 includes the system of any one of examples 18 to 24, including or excluding optional features. In this example, the adjustable pass filter is a piezo-actuated Fabry-Perot interferometer (FPI).

Example 26 includes the system of any one of examples 18 to 25, including or excluding optional features. In this example, the global reset is applied to the rolling shutter system after each face recognition capture.

Example 27 is a tangible, non-transitory, computer-readable medium. The computer-readable medium includes instructions that direct the processor to determine a passband that corresponds to a biometric capture application; adjust a voltage and frequency of an adjustable pass filter in response to the capture application and associated passband; and in response to a face recognition capture application, implement a global shutter system and a rolling shutter sensor global reset.

Example 28 includes the computer-readable medium of example 27, including or excluding optional features. In this example, the biometric capture application is one of a face recognition, iris scan, or eye gaze application.

Example 29 includes the computer-readable medium of any one of examples 27 to 28, including or excluding optional features. In this example, a second filter is to refine the passband via a plurality of stopbands.

Example 30 includes the computer-readable medium of any one of examples 27 to 29, including or excluding optional features. In this example, the adjustable pass filter is a liquid crystal filter. Optionally, the liquid crystal filter comprises a plurality of liquid crystal layers, wherein each layer is to reflect or transmit particular passbands.

Example 31 includes the computer-readable medium of any one of examples 27 to 30, including or excluding optional features. In this example, the adjustable pass filter is an electrochromatic filter.

Example 32 includes the computer-readable medium of any one of examples 27 to 31, including or excluding optional features. In this example, the adjustable pass filter is a Fabry-Perot interferometer (FPI). Optionally, the Fabry-Perot interferometer (FPI) changes the passband as a function of excitation of an actuator.

Example 33 includes the computer-readable medium of any one of examples 27 to 32, including or excluding optional features. In this example, the adjustable pass filter is a micro-electro-mechanical (MEMS) Fabry-Perot interferometer (FPI).

Example 34 includes the computer-readable medium of any one of examples 27 to 33, including or excluding optional features. In this example, the adjustable pass filter is a piezo-actuated Fabry-Perot interferometer (FPI).

Example 35 includes the computer-readable medium of any one of examples 27 to 34, including or excluding optional features. In this example, the global reset is applied to the rolling shutter system after each face recognition capture.

Example 36 is an apparatus for a combined camera system. The apparatus includes instructions that direct the processor to a means to tune a filter, wherein a passband of the filter is electrically adjusted; and a rolling shutter sensor, wherein an adjustable filter is to implement a global shutter and a rolling shutter sensor global reset.

Example 37 includes the apparatus of example 36, including or excluding optional features. In this example, the means to tune the filter is a tunable IR pass filter.

Example 38 includes the apparatus of any one of examples 36 to 37, including or excluding optional features. In this example, the means to tune the filter is a liquid crystal filter. Optionally, the liquid crystal filter comprises a plurality of liquid crystal layers, wherein each layer is to reflect or transmit certain passbands.

Example 39 includes the apparatus of any one of examples 36 to 38, including or excluding optional features. In this example, the means to tune the filter is an electrochromatic filter.

Example 40 includes the apparatus of any one of examples 36 to 39, including or excluding optional features. In this example, the means to tune the filter is a Fabry-Perot interferometer (FPI). Optionally, the Fabry-Perot interferometer (FPI) changes the passband as a function of excitation of an actuator. Optionally, the Fabry-Perot interferometer (FPI) is a micro-electro-mechanical (MEMS) Fabry-Perot interferometer (FPI). Optionally, the Fabry-Perot interferometer (FPI) is a piezo-actuated Fabry-Perot interferometer (FPI).

Example 41 includes the apparatus of any one of examples 36 to 40, including or excluding optional features. In this example, the apparatus includes an IR filter, wherein the IR filter is to provide a sharp cutoff band to refine the adjustable passband of the means to tune the filter.

Example 42 includes the apparatus of any one of examples 36 to 41, including or excluding optional features. In this example, the means to tune the filter is adjusted for a passband that corresponds to a biometric recognition application.

Example 43 includes the apparatus of any one of examples 36 to 42, including or excluding optional features. In this example, the adjustable IR pass filter is adjusted for a passband that corresponds to a face recognition, iris scan, or eye gaze application on the fly.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic device comprising:
a rolling shutter sensor;
machine readable instructions; and
processor circuitry to execute the machine readable instructions to:
cause the rolling shutter sensor to capture first image data during exposure to an infrared light pulse, the rolling sensor shutter to output a first signal corresponding to a first frame of the first image data,
reset a row of the rolling shutter sensor,
cause the rolling shutter sensor to capture second image data during exposure to ambient light, the rolling shutter to output a second signal corresponding to a second frame of the second image data,
determine a difference between the first signal and the second signal to generate a difference frame, and
process the difference frame for face recognition.

2. The electronic device of claim 1, wherein the difference frame is free of ambient infrared light.

3. The electronic device of claim 1, wherein the difference frame has a lower infrared light component than the first frame.

4. The electronic device of claim 1, further including a filter, the processor circuitry to switch the filter from a first mode to support face recognition to a second mode to support detection of at least one of an iris or an eye gaze.

5. The electronic device of claim 1, further including a filter, the processor circuitry to change at least one of a voltage or a frequency of the filter to change a transmission wavelength of the infrared light pulse.

6. The electronic device of claim 5, wherein the filter is to pass a first transmission wavelength to support face detection, a second wavelength different than the first wavelength to support iris detection, and a third wavelength different than the first wavelength and the second wavelength to support eye gaze detection.

7. The electronic device of claim 5, wherein the filter includes an actuator and mirrors, the actuator to change a distance between the mirrors to control a spectrum of light which passes to the rolling shutter sensor.

8. The electronic device of claim 1, further including an optics to focus light onto the rolling shutter sensor, the processor circuitry to adjust a focal length of the optics.

9. The electronic device of claim 8, wherein the optics include a lens array.

10. A computer readable storage device or disc comprising instructions to be executed to cause one or more processors to:
cause a rolling shutter sensor to output a first signal corresponding to a first frame of image data captured during exposure to an infrared light pulse,
reset a row of the rolling shutter sensor,
cause the rolling shutter sensor to output a second signal corresponding to a second frame of image data captured during exposure to ambient infrared light,
determine a difference between the first signal and the second signal, and
process the difference for face recognition.

11. The computer readable storage device or disc of claim 10, wherein the instructions cause the one or more processors to change a voltage of a filter to switch from a first mode for face recognition to a second mode for detection of at least one of an iris or an eye gaze.

12. The computer readable storage device or disc of claim 10, wherein the instructions cause the one or more processors to change at least one of a voltage or a frequency of a filter to change a transmission wavelength of the infrared light pulse.

13. The computer readable storage device or disc of claim 12, wherein the instructions cause the one or more processors to pass a first transmission wavelength to support face detection, a second wavelength different than the first wavelength to support iris detection, and a third wavelength different than the first wavelength and the second wavelength to support eye gaze detection.

14. The computer readable storage device or disc of claim 12, wherein the instructions cause the one or more processors to cause a change in a distance between a pair of mirrors of the filter to control a spectrum of light passing to the rolling shutter sensor.

15. The computer readable storage device or disc of claim 10, wherein the instructions cause the one or more processors to adjust a focal length of an optical device to focus light onto the rolling shutter sensor.

16. An electronic device comprising:
a filter;
a rolling shutter sensor; and
processor circuitry to execute instructions to:
cause the rolling shutter sensor to output a first signal corresponding to a first frame of video captured during exposure to infrared light emitted by the infrared light source,
detect a first body part based on the first signal,
change at least one of a voltage or a frequency of the filter,
cause the rolling shutter sensor to output a second signal corresponding to a second frame of video captured during exposure to infrared light emitted by the infrared light source,
globally reset rows of rolling shutter sensor,
cause the rolling shutter sensor to output a third signal corresponding to a third frame of video captured without exposure to the infrared light from the infrared light source,
determine a difference between the second signal and the third signal, and
process the difference for recognition of a second body part.

17. The electronic device of claim 16, further including a filter to pass a subset of signals transmitted through the filter.

18. The electronic device of claim 17, further including an instrument to focus light onto the rolling shutter sensor via the filter.

19. The electronic device of claim 18, wherein the processor circuitry is to adjust a focal length of the instrument.

20. The electronic device of claim 16, wherein the filter is an electrochromatic adjustable filter that is electrically adjustable to vary wavelengths that can pass through the filter.

21. The electronic device of claim 16, wherein the filter includes an actuator and mirrors, the actuator to change a distance between the mirrors to control a spectrum of light passing to the rolling shutter sensor.

22. An electronic device comprising:
means for capturing video; and
means for processing image data from the video, the processing means to:
  cause the capturing means to:
    capture first image data during exposure to an infrared light pulse, and
    output a first signal corresponding to a first frame of the first image data,
  reset a row of the capturing means,
  cause the capturing means to:
    capture second image data during exposure to ambient light, and
    output a second signal corresponding to a second frame of the second image data,
  determine a difference between the first signal and the second signal, and
  process the difference for face recognition.

23. The electronic device of claim 22, further including means for filtering light, the processing means to switch the filtering means from a first mode to support face recognition to a second mode to support detection of at least one of an iris or an eye gaze.

24. The electronic device of claim 22, further including means for filtering light, the processing means to change at least one of a voltage or a frequency of the filtering means to change a transmission wavelength of the infrared light pulse.

25. The electronic device of claim 22, wherein the filtering means includes means for controlling a spectrum of light passing to the capturing means.

* * * * *